(12) United States Patent
Boday et al.

(10) Patent No.: US 9,519,856 B2
(45) Date of Patent: *Dec. 13, 2016

(54) ENCODING INFORMATION IN MULTIPLE PATTERNED LAYERS

(71) Applicant: International Business Machines Corporation, Armonk, NY (US)

(72) Inventors: Dylan J. Boday, Tuscon, AZ (US); Bradford O. Brooks, Longmont, CO (US); Srinivas Babu Tummalapenta, Broomfield, CO (US); Jason T. Wertz, Pleasant Valley, NY (US); Hamza Yaswi, Erie, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/575,598

(22) Filed: Dec. 18, 2014

(65) Prior Publication Data

US 2016/0148089 A1 May 26, 2016

Related U.S. Application Data

(63) Continuation of application No. 14/549,129, filed on Nov. 20, 2014.

(51) Int. Cl.
*G06K 19/00* (2006.01)
*G06K 19/08* (2006.01)
(Continued)

(52) U.S. Cl.
CPC ............... *G06K 19/08* (2013.01); *G06K 1/121* (2013.01); *G06K 1/125* (2013.01);
(Continued)

(58) Field of Classification Search
CPC ..... G06Q 30/02; G06Q 20/341; G07F 7/1008; G06K 7/0004; G06K 7/084; G06K 7/087; G06K 19/077; G06K 19/07749; G06K 19/06187; G06K 19/12; G06K 19/06037; B42D 15/10
(Continued)

(56) References Cited

U.S. PATENT DOCUMENTS

| | | | | |
|---|---|---|---|---|
| 5,190,318 A | * | 3/1993 | Mantegazza | D21H 21/48 235/379 |
| 5,661,289 A | * | 8/1997 | Sasou | G06K 19/08 235/449 |

(Continued)

FOREIGN PATENT DOCUMENTS

| | | |
|---|---|---|
| JP | 2007034998 A | 2/2007 |
| JP | 2008147781 A | 6/2008 |

OTHER PUBLICATIONS

"List of IBM Patents or Patent Applications Treated as Related", Dec. 18, 2014, 2 pages.

(Continued)

*Primary Examiner* — Karl D Frech (57) ABSTRACT

An article of manufacture includes a substrate, a first patterned layer deposited on the substrate in a first region, and a second patterned layer deposited on the substrate in a second region. The first patterned layer encodes first information in first symbols that are detectable by an optical sensor. The second patterned layer encodes second information in second symbols that are detectable by a non-optical sensor. The second information is distinct from the first information and the second region at least partially overlaps the first region.

11 Claims, 4 Drawing Sheets

(51) Int. Cl.
   *G06K 19/06*      (2006.01)
   *G06K 1/12*       (2006.01)
(52) U.S. Cl.
   CPC ... *G06K 19/0614* (2013.01); *G06K 19/06037* (2013.01); *G06K 19/06187* (2013.01); *G06K 19/06196* (2013.01)
(58) Field of Classification Search
   USPC ........ 438/264; 235/375, 380, 440, 449, 487, 235/188, 492, 493, 494
   See application file for complete search history.

(56) References Cited

U.S. PATENT DOCUMENTS

| | | | |
|---|---|---|---|
| 6,343,745 B1 * | 2/2002 | Bohm | G06K 19/06196 235/493 |
| 7,073,724 B2 | 7/2006 | Walmsley et al. | |
| 7,802,730 B2 | 9/2010 | Senda | |
| 8,100,339 B2 | 1/2012 | Su | |
| 8,160,295 B2 | 4/2012 | Sakai et al. | |
| 8,550,367 B2 | 10/2013 | Fan et al. | |
| 2012/0211555 A1 | 8/2012 | Rowe | |
| 2013/0001310 A1 | 1/2013 | Miyazaki et al. | |
| 2013/0006877 A1 | 1/2013 | Brooks et al. | |
| 2013/0112760 A1 | 5/2013 | Schory et al. | |
| 2013/0166356 A1 | 6/2013 | Brooks et al. | |
| 2013/0193217 A1 | 8/2013 | Simske et al. | |

OTHER PUBLICATIONS

"3D Barcode", Generate-QR-Codes.org, http://www.generate-qr-codes.org/three-d-barcodes.html, Jan. 21, 2016, 2 pages.

* cited by examiner

■ First layer
● Second layer
▨ Third layer

FIG. 5

■ First layer
● Second layer
▨ Third layer
▱ Fourth layer

FIG. 6

ENCODING INFORMATION IN MULTIPLE PATTERNED LAYERS

I. CROSS REFERENCE TO RELATED APPLICATIONS

This application is a continuation application and claims priority from U.S. patent application Ser. No. 14/549,129, entitled "ENCODING INFORMATION IN MULTIPLE PATTERNED LAYERS," filed on Nov. 20, 2014, which is incorporated herein in its entirety.

II. FIELD OF THE DISCLOSURE

The present disclosure relates generally to encoding information in multiple patterned layers.

III. BACKGROUND

Computing systems to facilitate global commerce have simplified tracking products during shipment. Computing systems may gather information for computer-based inventory and tracking system using computer-readable labels or devices, such as radio-frequency identification (RFID) tags, bar codes, etc. Such computer-readable labels or devices are generally read using single purpose readers (e.g., RFID tag readers or bar code readers). Thus, for example, when a bar code is present on a box, in order for the bar code to be useful for automated inventory and tracking recordkeeping, a bar code reader is needed. If the box is at a location that has an RFID tag reader but does not have a bar code reader, then the bar code is not helpful.

Additionally, different computing systems may use different types of information for tracking purposes. To illustrate, a first country may require that a shipping container includes a label in a particular language describing contents of the container and a second country may require that the shipping container includes a label in a different language describing contents of the container. As another example, during examination of a container at a first port of entry within a country, the container may need to be labeled with particular information, whereas, when it is being loaded onto a truck for shipment within the country, the container may need to be labeled with different information. Accordingly, providing sufficient labeling information in a format that is computer-readable can be problematic.

IV. SUMMARY OF THE DISCLOSURE

Embodiments disclosed herein provide a system and method of tagging articles or containers in a manner that is usable across multiple technologies to facilitate computerized tracking (e.g., of goods, container, etc.). For example, a particular tag may include multiple types of computer-readable data to facilitate tracking or identification by multiple distinct types of reader devices. In another example, the article or container may be labeled in a manner that utilizes multiple technologies in order to provide improved security of data within the label. For example, data identifying a particular article or container may be encoded and provided on the label in a first format and a key to decode the label may be provided in a distinct layer readable using a different reader technology. Additionally, using such labels, significantly more information can be provided per unit of area of a label. For example, a first type of information may be encoded in a first layer, and a second distinct type of information may be provided in a second layer that at least partially overlaps the first layer. Additional layers (which may also be at least partially overlapping) may be used for additional types of information. To illustrate, a simple classification of an article or container according to a taxonomy may be provided in a first layer whereas more detailed information about contents of the article or container, origins of the article or container, etc., may be provided in a second layer, a third layer and so forth. Accordingly, specific information that is useful for a particular location may be accessible without providing additional detail where it is not needed.

Further, simple manufacturing processes may be used to manufacture the labels and encode information therein. For example, 3D printing and ink printing technologies may be used along with other encoding processes such as magnetic encoding, etc.

In a particular embodiment, an article of manufacture includes a substrate, a first patterned layer deposited on the substrate in a first region, and a second patterned layer deposited on the substrate in a second region. The first patterned layer encodes first information in first symbols that are detectable by an optical sensor, and the second patterned layer encodes second information in second symbols that are detectable by a non-optical sensor. The second information is distinct from the first information, and the second region at least partially overlaps the first region.

In another particular embodiment, a method includes depositing a first patterned layer on a first region of a substrate and depositing a second patterned layer on a second region of the substrate, the second region at least partially overlapping the first region. The first patterned layer encodes first information in first symbols that are detectable by an optical sensor, and the second patterned layer encodes second information in second symbols that are detectable by a non-optical sensor. The second information is distinct from the first information.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

VI. DETAILED DESCRIPTION

Figure 1:
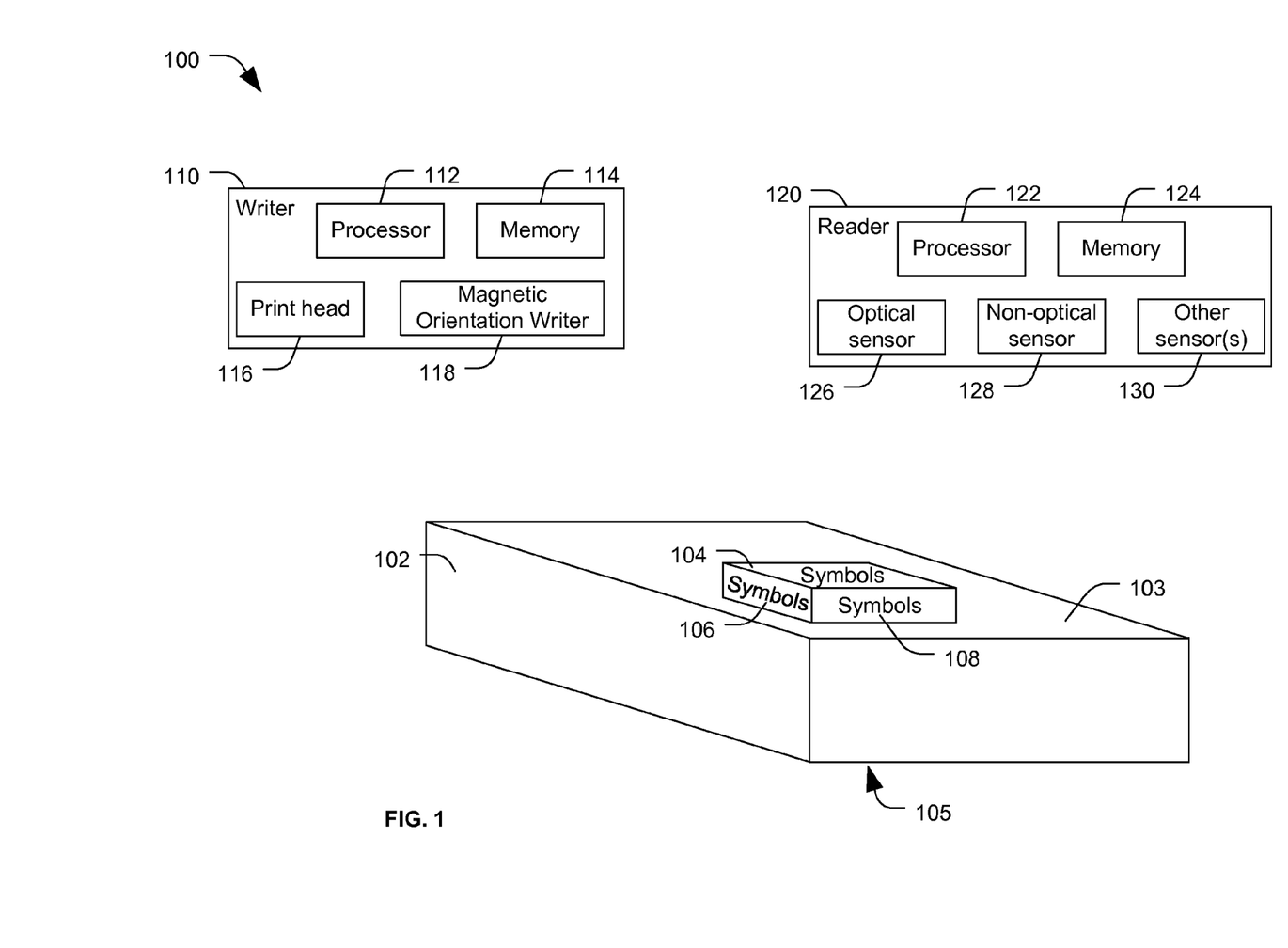
FIG. 1 is a diagram illustrating a particular embodiment of a system that includes a substrate and information encoded in a plurality of layers on the substrate.

FIG. 1 illustrates a particular embodiment of a system 100 including a substrate 102 and information encoded in a plurality of layers on the substrate 102. For example, the information may be encoded in symbols 104, 106, and 108. The symbols 104-108 may be applied to the substrate 102 using a writer 110 and information may be extracted from the symbols 104-108 using a reader 120. As used herein, encoding refers to representing information in a manner that enables subsequent retrieval (e.g., decoding) of the information. For example, information may be encoded by generating symbols representing the information. The symbols may be instantiated visibly (e.g., as pictographs, alphanumeric text, shapes, color codes, position or orientation of visual markers, etc.) or invisibly (e.g., electromagnetic particle position or orientation, chemical properties, etc.). In particular embodiments, the symbols are computer-readable, and, in some instances, may also be human-readable. For example, alphanumeric strings maybe both human-readable and computer-readable.

The symbols 104-108 may be colocated on the substrate 102 (e.g., substantially overlapping), may be separately located on the substrate 102 (e.g., non-overlapping), or a combination thereof (e.g., some overlapping and others non-overlapping). For example, the first symbols 104 may correspond to or be included within a first patterned layer that encodes first information at a first region of the substrate 102, the second symbols 106 may correspond to or be included with a second patterned layer that encodes second information at a second region of the substrate 102, and the third symbols 108 may correspond to or be included with a third patterned layer that encodes third information at a third region of the substrate 102. The one or more of the patterned layers may at least partially overlap another of the patterned layers. For example, in a particular embodiment, the first region and the second region may substantially be colocated (e.g., covering, applied to, or formed at a particular region of the substrate 102). In another example, the first region and the second region may overlap but not be coextensive. To illustrate, the first region may be smaller than or larger than the second region. In another example, the first region may partially overlap the second region but not entirely overlap the second region. The third region may at least partially overlap the first and/or second regions or may be distinct.

Additionally, two or more sets of the symbols 104-108 may encode the same information, may encode different information, or may encode complimentary information. When two or more sets of the symbols 104-108 encode the same information, they may use different encoding techniques, they may be formed on the substrate 102 using different techniques, or both. For example, the first symbols 104 and the second symbols 106 may encode the same information; however, the first symbols 104 may encode the information in a linear or 1D bar code, and the second symbols 106 may encode the information in a matrix or 2D bar code. In another example, the first symbols 104 may be applied to the substrate 102 using a first ink or pigment that reflects light in a human visible spectrum, and the second symbols 106 may be applied to the substrate 102 using a second ink or pigment that reflects light in a spectrum that is not human visible. Additionally or in the alternative, combinations of other techniques for applying the symbols 104-108, as described further below, may be used.

The substrate 102 may be an article of manufacture, such as a consumer product, a component of an assembly, a commodity, or another article of commerce. In another example, the substrate 102 may be portion of a container, such as a container for an article of manufacture. In yet another example, the substrate 102 may be a portion of a label, such as a polymer layer or an interface layer that is used to apply the symbols 104-108 to an article of manufacturing or a container. For example, the substrate 102 may be a polymer layer that has symbols 104-108 on a first surface 103 or embedded within the substrate 102. In this example, the substrate 102 may have an adhesive layer on a second surface 105. The adhesive layer may be used to apply the label to the article of manufacture or to the container.

The writer 110 may be used to apply the symbols 104-108 to the substrate 102. In a particular embodiment, the writer 110 is an electrical device that includes a processor 112 and a memory 114. The memory 114 may store instructions that are executable by the processor 112 to encode particular information. The information may be stored in the memory 114, generated by the processor 112 based on particular instructions, accessed from a database (not shown), provided from the user, or obtained from another source. The information may be encoded to generate the symbols 104-108. For example, the information may include a classification or taxonomy of an article of manufacture, a name of the article of manufacture, information about contents of an article of manufacture or a container, information about origins or locations of manufacture of the article of manufacture or container, shipping information about the article of manufacture or container, information about contents of a container, and so forth.

The writer 110 may also include one or more print heads 116. The print heads 116 may be used to apply the symbols 104-108 to the substrate. For example, the print heads 116 may include one or more ink print heads, one or more three-dimensional printer print heads, or both. To illustrate, the print heads 116 may include an ink print head that is configured to print an ink or pigment layer that reflects light having a wavelength in a human-visible spectrum. In another example, the print heads 116 may include an ink print head that is configured to apply an ink or pigment layer that reflects light having a wavelength in a non-human-visible spectrum (e.g., an infrared or ultraviolet spectrum). In another example, the print heads 116 may include an extruder that is configured to apply one or more polymer layers to generate a three-dimensional symbol on the first surface 103 out of the substrate 102. The one or more polymer layers may be used to encode information that is represented by a position of the one or more polymer layers on the substrate, by a thickness of the one or more polymer layers, by a shape of the one or more polymer layers, or a combination thereof. In another example, the print heads 116 may include a print head that is configured to apply magnetic particles to the first surface 103 of the substrate 102. The magnetic particles may be applied at locations that encode specific information. To illustrate, the second symbols 106 may represent particular information based on presence or absence of magnetic particles at a particular location on the substrate 102. Thus, the print heads 116 may be used to apply one or more layers that each encode information.

Additionally, in some embodiments, the writer 110 may include a magnetic orientation writer. In such embodiments, the magnetic orientation writer may be used to modify orientations of poles of magnetic particles to encode information. For example, the magnetic particles may be applied to the substrate 102 by one or more of the print heads. After the magnetic particles are applied, orientation (or polarity) of the magnetic particles may be modified by the magnetic orientation writer 118 to encode specific information. In this example, the position of the magnetic particles may encode first information (e.g., as first symbols 104) and the orientation of poles of the magnetic particles may encode second information (e.g., as second symbols 106)

The system 100 also includes a reader 120. The reader 120 may include a processor 122 and memory 124. The memory 124 may include instructions that are executable by the processor 122 to detect and decode the symbols 104-108. For example, the instructions may enable the processor 122 to retrieve information from sensors, such as one or more optical sensors 126, one or more non-optical sensors 128, and other sensors 130. For example, the processor 122 may execute the instructions to instruct or control the optical sensors 126 to capture data corresponding to light reflected from the symbols 104-108 in a human-visible or in a non-human-visible spectrum. The data may be retrieved by the optical sensors 126 as a set of pixels, which may be processed and analyzed by the processor 122 to extract information encoded in the one or more sets of the symbols 104-108. As another example, the processor 122 may execute the instructions to instruct or control the non-optical sensors 128 to capture data related to the symbols 104-108. The non-optical sensors 128 may include electrical, electromagnetic or magnetic sensors, chemical sensors, physical sensors (e.g., touch-based sensors), thermal sensors, or other types of non-optical sensors. The non-optical sensors 128 may capture the data as a grid or pixels associated with a region of the substrate 102 that is read, thickness information associated with various locations of the region read, magnetic orientation information associated with portions of the region read, and so forth. The processor 122 may receive the data from the non-optical sensors 128 and may use the data to extract (e.g., decode) information encoded in one or more sets of the symbols 104-108. The processor 122 may also control operation of the other sensors 130. The other sensors 130 may be used to extract additional data related to the symbols 104-108, such as additional non-optical data or additional optical data. In another example, the other sensors 130 may be used to define metes and bounds of the region to be sensed. For example, the other sensors 130 may be used to identify fiducial marks used to indicate edges of patterned layers that encode information.

Thus, the substrate 102 may include multiple layers with each layer encoding one or more symbols of the symbols 104-108. In a particular embodiment, a combination of patterned layers may be applied to the substrate 102 so that each layer at least partially overlays one or more underlying layers. In this embodiment, materials, encoding techniques and application methods of each of the overlaying layers are selected such that underlying layers remain readable. To illustrate, a patterned ink layer may be deposited on the substrate 102 at a first region. The patterned ink layer may encode first information in the first symbols 104 that reflect light in a human visible spectrum. Additionally, an ink used for the patterned ink layer may include magnetic particles. Alternatively, a layer that includes magnetic particles may be applied over the patterned ink layer such that the patterned ink layer is not obscured (e.g., remains visible). The polarity or pole orientation of the magnetic particles may be modified to encode second information in the second symbols. Thus, an optical sensor (such as one of the optical sensors 126 of the reader 120) can be used to detect and decode the first symbols 104, and a non-optical sensor (such as one of the non-optical sensors 128 of the reader 120) can be used to detect and decode the second symbols 106. Other combinations of patterned layers are also possible, as described further below. Additionally, although three sets of symbols (e.g., first symbols, 104, second symbols 106, and third symbols 108) are shown in FIG. 1, more than or fewer than three sets of symbols may be applied to the substrate 102.

During operation, the writer 110 may receive information from a user, from a computing system (e.g., a database), or from another source that provides information to be encoded in the symbols 104-108 on the substrate 102. The processor 112 may execute instructions from the memory 114 to generate data indicating a symbolic representation of the information to be encoded. The information to be encoded may include multiple layers of information, such as a taxonomic classification of an article and a description of the article. In a particular embodiment, data to be encoded in a first set of symbols may be encrypted. In this embodiment, a key to decrypt the encrypted data may be encoded in a second set of symbols. The first set of symbols and the second set of symbols may be applied to the substrate 102 in different patterned layers. In another embodiment, data represented by a first set of symbols (such as the first symbols 104) may include a redundant copy of data represented by a second set of symbols (e.g., the second symbols 106). In this embodiment, if one set of symbols is damaged or unreadable (e.g., due to lack of an appropriate type of reader), the information may be recovered using the other set of symbols.

After determining specific symbols to be applied to the substrate 102, the processor 112 may control the print heads 116 and the magnetic orientation writer 118 to form the symbols on the substrate 102 by applying one or more layers to the substrate 102. For example, an ink or pigment layer may be applied to the substrate 102 to form a first patterned layer that reflects light in a wavelength that is in a human-visible spectrum. A second ink or pigment layer may be applied to the substrate 102 to form a second patterned layer that reflects light having a wavelength in a spectrum that is not human visible (e.g., an ultraviolet or infrared wavelength). The first patterned layer, the second patterned layer or a third patterned layer may include magnetic particles. The magnetic particles may be positioned to encode third information. Additionally or in the alternative, the magnetic orientation writer 118 may be used to modify orientation of poles of the magnetic particles to encode fourth information.

Additionally or in the alternative, the print heads 116 may be used to apply one or more patterned layers that encode symbols represented by a configuration or shape of polymer layers or a thickness of the polymer layers. For example, presence of polymer layers (or polymer layers of a particular thickness) at a first portion of the substrate 102 may represent a first symbol, and absence of the polymer layers (or the of polymer layers having a thickness less than the particular thickness) at the first portion of the substrate 102 may represent a second symbol. A material of the polymer layers may be selected such that the thickness of the polymer layers is detectable using the optical sensor 126 (e.g., based on color or reflectance changes) or using the non-optical sensor 128. Thus, the symbols 104-108 may include human-visible-optical-readable symbols, optically readable symbols that are not human-visible, symbols represented by locations of magnetic particles, symbols represented by orientations or polarizations of magnetic particles, symbols represented by thickness of polymer layers, or any combinations thereof.

Although FIG. 1 illustrates the symbols 104-108 applied to the first surface 103 of the substrate 102, in other embodiments, one or more sets of the symbols 104-108 may be formed within the substrate 102 (e.g., below the first surface 103 of the substrate 102). For example, one or more of the print heads 116 may be configured to inject ink or pigment below the first surface 103. Further, in some embodiments, the substrate 102 may be a three-dimensional (3D) article and the symbols 104-108 may be formed on one or more faces of the 3D article. For example, the 3D article may include multiple faces where each face corresponds to a side or facet of a 3D structure. In this example, the first region that includes the first patterned layer encoding first symbols 104 and the second region that includes the second patterned layer encoding second symbols 106 may be on a first face of a 3D structure, and other faces of a 3D structure may include other patterned layers. To illustrate, a second face of the 3D structure may include a third patterned layer forming the third symbols 108, and a third face of a 3D structure may include a fourth patterned layer forming additional symbols (not shown). Alternatively, the third patterned layer and the fourth patterned layer may both be applied to the second face and the third face may include a fifth patterned layer, a sixth patterned layer, etc. Multiple faces of the 3D structure may include patterned layers that are readable using optical sensors, non-optical sensors, other sensors, or combinations thereof. Thus, multiple layers of data may be encoded on each face of the three-dimensional structure allowing large quantities of information to be stored and accessible to a variety of different technologies for a variety of different uses and contexts. Additionally, since data can be encrypted and the key to decrypt the data provided using a different technology in a different layer, secure information may be provided along with non-secure information to enable various uses of the information provided on the substrate. Further, different faces of the 3D structure may be used for different purposes. For example, a first face may be used for symbols representing information in a first language, and a second face may be used for symbols representing information in a second language. As another example, a first face may be used for symbols that encode information used by a first party (e.g., an overseas shipper), and a second face may be used for symbols that encode information used by a second party (e.g., a manufacturer or purchaser).

Although FIG. 1 illustrates the writer 110 as a single device, in some implementations, the writer 110 may correspond to or include multiple separate devices. For example, one or more of the print heads 116 may be a separate device. As another example, the magnetic orientation writer 118 may be a separate device from one or more of the print heads 116. In such implementations, the processor 112 and the memory 114 may be part of a device that is distinct from one or more of the print heads 116, distinct from the magnetic orientation writer 118, or both. For example, the processor 112 and the memory 114 may be part of a computer that provides instructions, commands, and/or data to printing devices (such as one or more of the print heads 116 or the magnetic orientation writer 118) to form the symbols 104-108 on the substrate.

Although FIG. 1 illustrates the reader 120 as a single device, in some implementations, the reader 120 may correspond to or include multiple separate devices. For example, one or more of the sensors 126, 128, 130 may be a separate device. In such implementations, the processor 122 and the memory 124 may be part of a device that is distinct from one or more of the print heads 116, distinct from the magnetic orientation writer 118, or both. For example, the processor 122 and the memory 124 may be part of a computer that receives data representative of the symbols 104-108 from the sensors 126, 128, 130.

FIGS. 2-5 illustrate stages of a particular embodiment of a process of encoding information as symbols on a particular region of a substrate using multiple patterned layers. FIGS. 2-5 each include a front view and a cross-sectional view of a substrate 200 and one or more layers applied to the substrate 200 to encode information. In a particular embodiment, the FIGS. 2-5 correspond to various stages of manufacturing the substrate 102 and symbols 104-108 of FIG. 1 according to one example. The order and type of layers described is merely one example of the order and type of layers that could be formed using the system 100.

Figure 2:
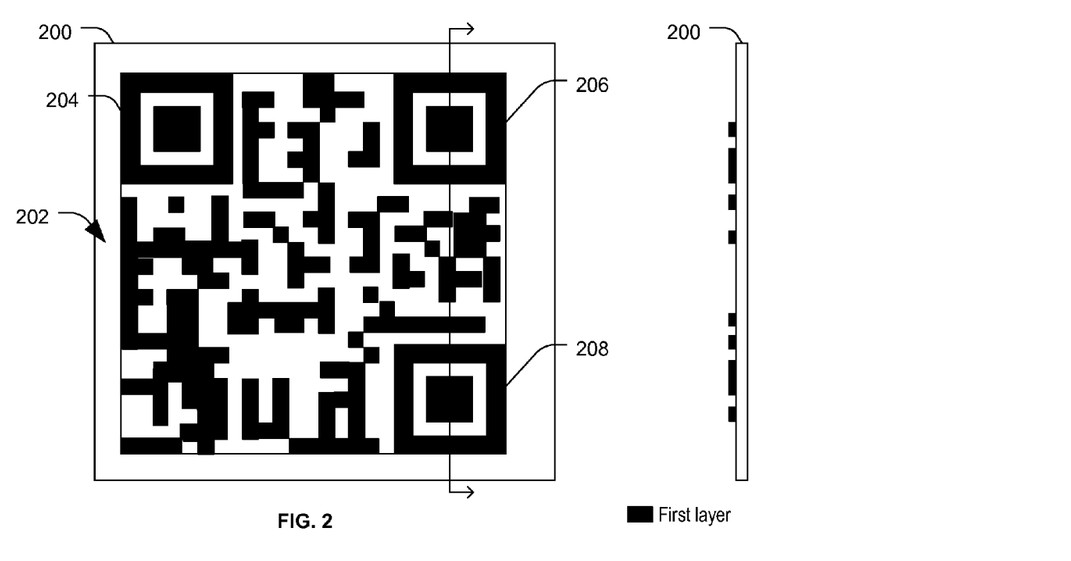
FIGS. 2, 3, 4, and 5 illustrate stages of a particular embodiment of a process of encoding information as symbols on a particular region of a substrate using multiple patterned layers.

FIG. 2 illustrates a first layer 202 formed (e.g., deposited, etched, imprinted, etc.) by one of the print heads 116 of FIG. 1) in or on the substrate 200. In the particular example illustrated in FIG. 2, the patterned layer is a 2D bar code or matrix code, which may be formed by a patterned ink or pigment layer. In other examples, the first layer 202 may encode information using another technique, such as text, pictographs, a 1D bar code, etc.

The first layer 202 may reflect light in a human-visible spectrum or in a spectrum that is not human-visible. The first layer 202 may include various regions that act as fiducials (e.g., fiducial marks 204-208) for reading information from the first layer 202, for reading information from other layers, or both. Although three fiducial marks are shown in FIG. 2, in other examples, more than three or fewer than three fiducial marks may be used. Additionally or in the alternative, different types of fiducial marks may be used or the fiducial marks may be at different positions. To illustrate, in a one-dimensional bar code representation, fewer fiducial marks may be used. In another example, a text or pictograph representation may not include fiducial marks.

Figure 3:
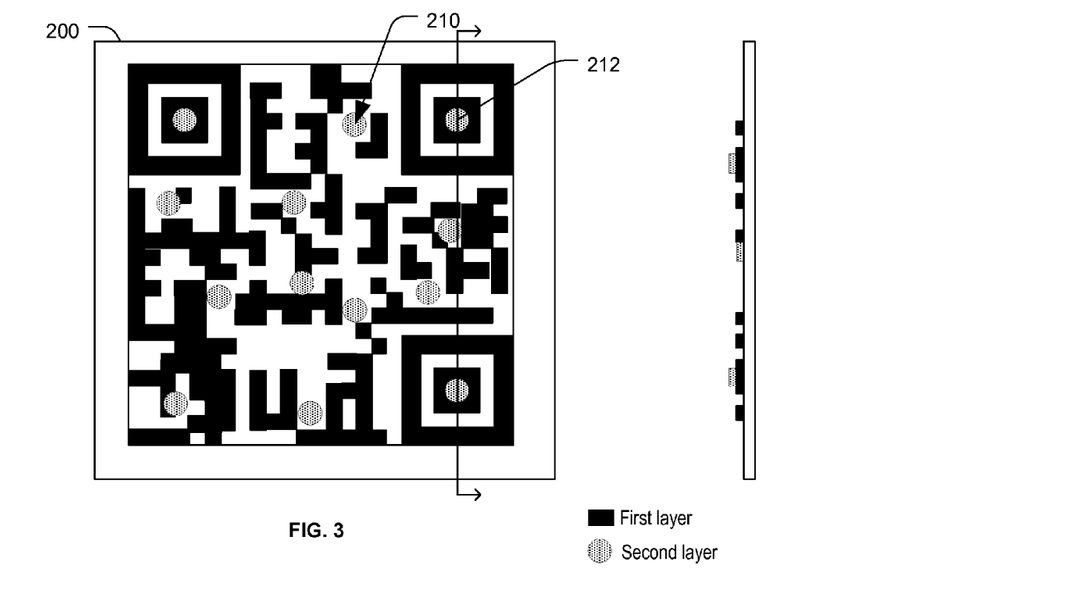

After applying the first layer 202, a second layer 210 may be applied as shown in FIG. 3. FIG. 3 illustrates applying the second layer 210 as multiple dots or points at least partially overlying the first layer 202. The second layer 210 may also include fiducials, such as a fiducial mark 212. Alternately, the second layer 210 may not include fiducials. In the specific example illustrated in FIGS. 2-5, the second layer 210 may include magnetic particles. The locations of the magnetic particles may encode specific information as position symbols. A position, shape, and/or materials used to form the second layer 210 may be selected such that symbols represented by the first layer 202 are readable through the second layer 210. After application of the second layer 210, orientations of the poles of the magnetic particles may be modified (e.g., using the magnetic orientation writer 118 of FIG. 1) to encode additional data based on orientation of magnetic particles within the second layer 210. The orientations of the poles of the magnetic particles may be modified immediately following formation of the second layer, or after another stage of formation of the patterned layers. To illustrate, the orientations of the poles of the magnetic particles may be modified after the fourth layer 230 of FIG. 5 is formed.

Figure 4:
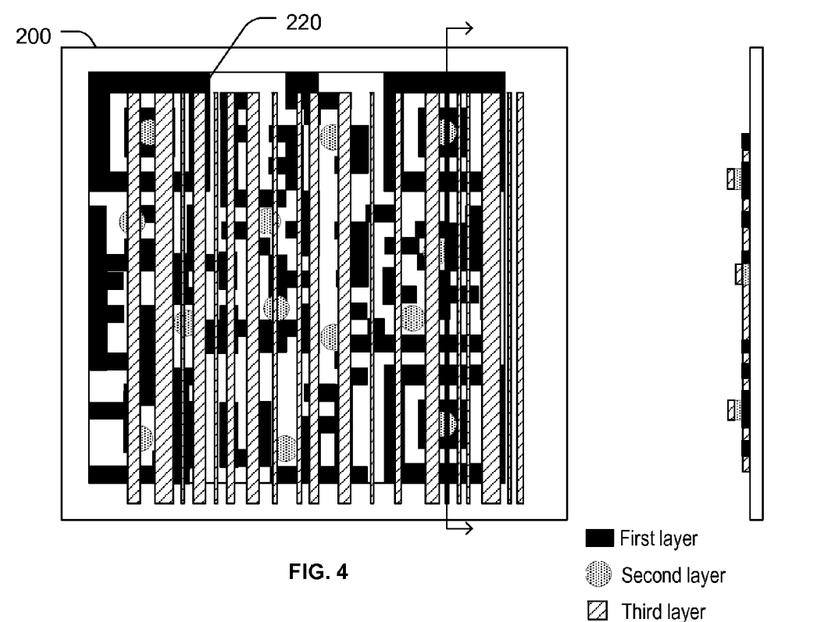

FIG. 4 illustrates a third step in a process of manufacturing a multiple set of symbols encoding data. In FIG. 4, a third layer 220 may be applied at least partially overlapping the first layer 202, at least partially overlapping the second layer 210, or both. In a particular embodiment, the third layer 220 may include an ink or pigment layer that reflects light in a spectrum that is not human-visible (e.g., in an ultraviolet or infrared wavelength). The position, shape, and/or materials used to form the third layer 220 may be selected such that symbols represented by the first layer 202 and symbols represented by the second layer 210 are readable through the third layer 220. For example, the first layer 202 may be readable through the third layer 220 based on reflection of light in a different spectrum. And the second layer 210 may be readable through the third layer 220 using a non-optical sensor (e.g., a magnetic sensor). In the particular example illustrated in FIG. 4, the third layer 220 encodes information in a one-dimensional bar code. However, in other examples the third layer 220 may encode information using another technique, such as text, pictographs, a 2D bar code, etc.

Figure 5:
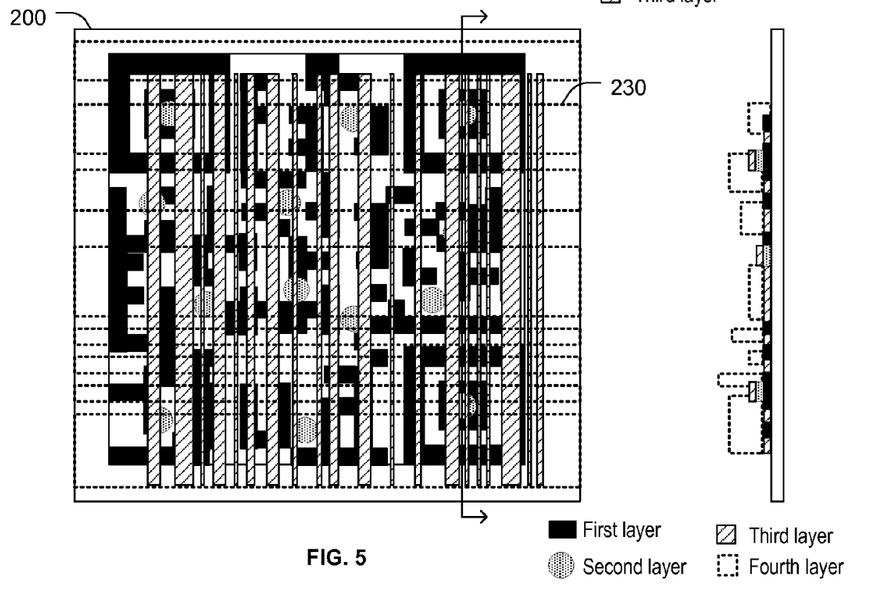

FIG. 5 illustrates an additional step during process of manufacturing an encoded set of symbols on the substrate 200. In FIG. 5, a fourth layer 230 may be applied. The fourth layer 230 may at least partially overlap one or more of the first layer 202, the second layer 210, or the third layer 220. The position, shape, and/or materials used to form the fourth layer 230 may be selected such that symbols represented by the first layer 202, symbols represented by the second layer 210, and symbols represented by the third layer 220 are readable through the fourth layer 230. For example, the first layer 202 may be readable through the fourth layer 230 based on reflection of light in a first spectrum, the second layer 210 may be readable through the fourth layer 230 using a non-optical sensor (e.g., a magnetic sensor), and the third layer 220 may be readable through the fourth layer 230 based on reflection of light in a second spectrum.

In the particular example illustrated in FIG. 5, the fourth layer 230 encodes information based on a thickness and/or position of a polymer layer. However, in other examples the fourth layer 230 may encode information using another technique, such as text, pictographs, a 1D bar code, a 2D bar code, etc. In the particular example illustrated in FIG. 5, different portions of the polymer may be applied at different thicknesses such that a thickness of the polymer and a location of the polymer may together or separately encode information as additional symbols.

Although FIGS. 2-5 show formation of four layers, encoding four or more sets of symbols, in other examples, more than four layers, fewer than four layers, different layers, or a different order of the layers may be used. Additionally, the number of sets of symbols represented by the layers may be the same as the number of layers, or may be different than (e.g., greater than or less than) the number of layers. To illustrate, the second layer may encode information based on both the locations of magnetic particles and the orientation of poles of the magnetic particles. As another example, the fourth layer may encode information based on the locations of polymer layers as well as the thickness of the polymer layers. Further, additional information may be encoded based on specific positioning of the layers or symbols of the layers with respect to one another. To illustrate, specific positions of the symbols of the first layer 202 relative to symbols of the third layer 220 may encode additional information. For example, the third layer 220 may directly overlay the first layer 202 when the third layer 220 includes a key to decrypt encrypted information in the first layer 202. However, when the third layer 220 includes information that is independent of or not related to the first layer 202, the third layer 220 may be offset from the first layer 202, as illustrated in FIG. 4. Accordingly, multiple layers of information may be encoded in a particular region using different computerized reading and writing mechanisms in order to facilitate providing useful content for computer-readable inventory tracking management systems.

Figure 6:
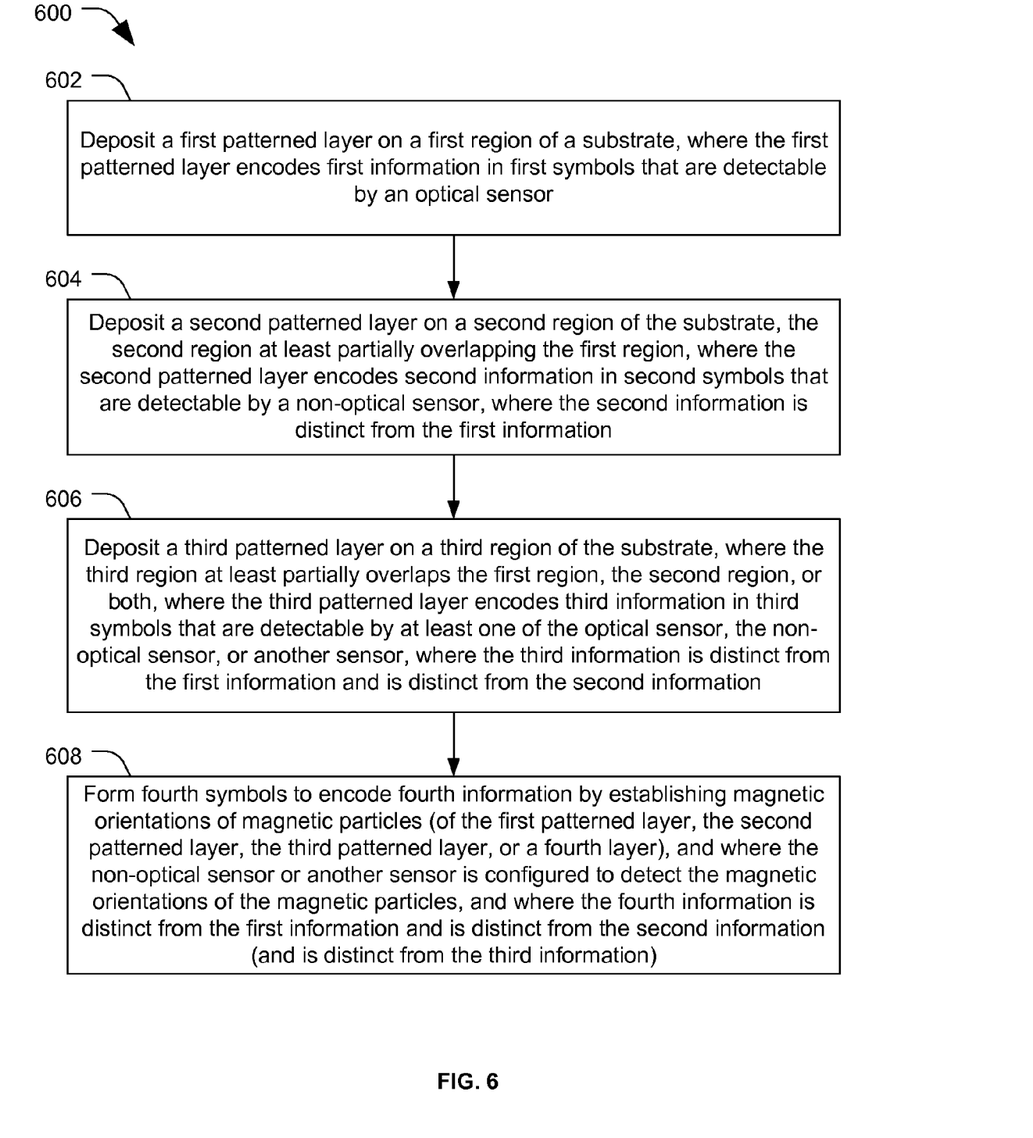
FIG. 6 is a flowchart of a particular embodiment of a method of encoding information on a substrate.

FIG. 6 illustrates a flowchart of a particular embodiment of a method 600 of encoding information on a substrate. The method 600 includes, at 602, depositing a first patterned layer on a first region of a substrate. For example, the first layer 202 may be deposited on the substrate 200 of FIG. 2. The first patterned layer may encode first information in first symbols that are detectable by an optical sensor. For example, the first patterned layer may encode information in a human-visible ink that is detectable by the optical sensors 126. In another example, the first layer 202 may encode information that is not human-visible but is detectable by the optical sensors 126 using, for example, an ultraviolet or infrared optical detection. The symbols may include a bar code (e.g., a 1D or 2D bar code), text, pictographs, or other symbols.

The method may also include, at 604, depositing a second patterned layer on a second region of the substrate. For example, the second patterned layer 210 may be deposited on a second region of the substrate 200. In another example, the fourth patterned layer 230 may be deposited on the second region of the substrate 200. The second region may at least partially overlap the first region. The second patterned layer may encode second information in second symbols that are detectable by a non-optical sensor, such as the non-optical sensor 128 of FIG. 1.

In a particular embodiment, the second information may be distinct from the first information. For example, the first information may include a first description related to an article of manufacture or contents of a container, and the second information may include additional or different information about the article of manufacture or contents of the container. In another example, the first information may include encrypted information about the article or contents of the container, and the second information may include a key to decrypt the first information. Although specific examples have been given of using the first layer 202, the second layer 210, the third layer 220, and the fourth layer 230 of FIGS. 2-5, in other embodiments, the first patterned layer and second patterned layer of the method 600 may include any combination of the first-fourth layers of FIGS. 2-5. For example, the first layer 202, the third layer 220 and fourth layers 230 are described in FIGS. 2, 4 and 5 as being optically readable layers. Accordingly, the first patterned layer of the method 600 may correspond to the first layer 202, the third layer 220, the fourth layer 230, or a combination thereof. Similarly, the second layer 210 and the fourth layer 230 of FIGS. 3 and 5 are versions of non-optically readable layers. Accordingly, the second patterned layer of the method 600 may correspond to the second layer 210, the fourth layer 230, or a combination thereof. Additionally, the first patterned layer and the second patterned layer may be deposited in any order. For example, the first patterned layer may be deposited before, after or during deposition of the second patterned layer.

The method 600 may also include depositing additional layers, such as a third patterned layer on a third region of a substrate. The third region of the third region may partially overlap the first region, partially overlap the second region, or both. Alternately, the third patterned layer may be in a distinct region of the substrate. The third patterned layer may encode third information in third symbols that are detectable by an optical sensor, a non-optical sensor, or another sensor. The third information may be distinct from the first information, may be distinct from the second information, may be distinct from both, or may be related to either or both the first information and the second information. The method 600 may also include forming fourth symbols to encode fourth information by establishing magnetic orientations of magnetic particles of one of the other layers, such as the first patterned layer, the second patterned layer, the third patterned layer, or a fourth patterned layer. A non-optical sensor or another senor may be used to detect the orientations of the magnetic particles. The fourth information may be distinct from the first information, may be distinct from the second information, may be distinct from the third information, or may be distinct from all of the first, second, and third information. Alternately, the fourth information may be related to or complimentary to or the same as the first, second, or third information.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:
1. An article of manufacture comprising:
a substrate;
a first patterned layer deposited on the substrate in a first region, wherein the first patterned layer encodes first information in first symbols that are detectable by an optical sensor; and
a second patterned layer deposited on the substrate in a second region, the second region at least partially overlapping the first region, wherein the second patterned layer encodes second information in second symbols that are detectable by a non-optical sensor, wherein the second information is distinct from the first information,
wherein the substrate is a three-dimensional structure including a plurality of faces, each face corresponding to a side of the three-dimensional structure, wherein the first region and the second region are portions of a first face of the plurality of faces, and further comprising a third patterned layer deposited on the substrate in a third region, wherein the third region is on a second face of the plurality of faces, wherein the third patterned layer encodes third information in third symbols that are detectable by at least one of the optical sensor, the non-optical sensor, or another sensor, and wherein the third information is distinct from the first information and is distinct from the second information.

2. The article of manufacture of claim 1, wherein the first patterned layer comprises an ink or pigment layer that reflects light having a wavelength in a human visible spectrum, and wherein the optical sensor is configured to detect the light having the wavelength in the human visible spectrum.

3. The article of manufacture of claim 1, wherein the first patterned layer comprises an ink or pigment layer that reflects light having a wavelength in a non-human visible spectrum, and wherein the optical sensor is configured to detect the light having the wavelength in the non-human visible spectrum.

4. The article of manufacture of claim 1, wherein the first patterned layer comprises one or more polymer layers, wherein the first symbols are represented by thicknesses of the one or more polymer layers such that a particular symbol corresponds to a first thickness of the one or more polymer layers and a different symbol corresponds to a second thickness of the one or more polymer layers, and wherein the optical sensor is configured to detect differences in thickness of the one or more polymer layers.

5. The article of manufacture of claim 1, wherein the second patterned layer comprises one or more polymer layers, wherein the second symbols are represented by thicknesses of the one or more polymer layers such that a particular symbol corresponds to a first thickness of the one or more polymer layers and a different symbol corresponds to a second thickness of the one or more polymer layers, and wherein the non-optical sensor is configured to detect differences in thickness of the one or more polymer layers.

6. The article of manufacture of claim 1, wherein the second patterned layer comprises magnetic particles, wherein the second symbols are indicated by locations of the magnetic particles, and wherein the non-optical sensor is configured to detect the locations of the magnetic particles.

7. The article of manufacture of claim 1, wherein the second patterned layer comprises magnetic particles, wherein the second symbols are indicated by magnetic orientations of the magnetic particles, and wherein the non-optical sensor is configured to detect the magnetic orientations of the magnetic particles.

8. The article of manufacture of claim 1, further comprising a third patterned layer deposited on the substrate in a third region, wherein the third region at least partially overlaps the first region, the second region, or both, wherein the third patterned layer encodes third information in third symbols that are detectable by at least one of the optical sensor, the non-optical sensor, or another sensor, and wherein the third information is distinct from the first information and is distinct from the second information.

9. The article of manufacture of claim 1, wherein:
the first information is encrypted using a first key and the second information enables access to the first key; or
the second information is encrypted using a second key and the first information enables access to the second key.

10. The article of manufacture of claim 1, further comprising a fourth patterned layer deposited on the substrate in a fourth region, wherein the fourth region is on a third face of the plurality of faces, wherein the fourth patterned layer encodes fourth information in fourth symbols that are detectable by at least one of the optical sensor, the non-optical sensor, or the other sensor, and wherein the fourth information is distinct from the first information, the second information, and the third information.

11. The article of manufacture of claim 10, wherein a fourth face of the substrate is coupled to an object or coupled to a container associated with the object, and wherein the first information is descriptive of a first aspect of the object, the second information is descriptive of a second aspect of the object, the third information is descriptive of a third aspect of the object, and the fourth information is descriptive of a fourth aspect of the object.

* * * * *